United States Patent
Makki et al.

(10) Patent No.: US 12,356,461 B2
(45) Date of Patent: Jul. 8, 2025

(54) RANDOM ACCESS CHANNEL (RACH) PROCESS FOR INTEGRATED ACCESS AND BACKHAUL (IAB) NETWORKS

(71) Applicant: Telefonaktiebolaget LM Ericsson (publ), Stockholm (SE)

(72) Inventors: Behrooz Makki, Pixbo (SE); Erik Dahlman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 400 days.

(21) Appl. No.: 17/774,569

(22) PCT Filed: Oct. 29, 2020

(86) PCT No.: PCT/EP2020/080370
§ 371 (c)(1),
(2) Date: May 5, 2022

(87) PCT Pub. No.: WO2021/089400
PCT Pub. Date: May 14, 2021

(65) Prior Publication Data
US 2022/0408490 A1 Dec. 22, 2022

Related U.S. Application Data

(60) Provisional application No. 62/932,585, filed on Nov. 8, 2019.

(51) Int. Cl.
*H04W 72/04* (2023.01)
*H04B 7/06* (2006.01)
(Continued)

(52) U.S. Cl.
CPC ..... *H04W 74/0833* (2013.01); *H04W 52/325* (2013.01); *H04W 52/36* (2013.01)

(58) Field of Classification Search
CPC ............. H04W 74/0833; H04W 48/12; H04W 74/006; H04W 52/242; H04W 52/325;
(Continued)

(56) References Cited

U.S. PATENT DOCUMENTS

2011/0110258 A1* 5/2011 Ishii ..................... H04J 11/0069
370/252
2014/0169198 A1* 6/2014 Golitschek Edler von Elbwart ...
H04L 5/0085
370/252
(Continued)

FOREIGN PATENT DOCUMENTS

| | | |
|---|---|---|
| WO | 2019/212297 A1 | 11/2019 |
| WO | 2020/027626 A1 | 2/2020 |

OTHER PUBLICATIONS

International Search Report and Written Opinion issued in International Application No. PCT/EP2020/080370, dated Mar. 30, 2021 (20 pages).
(Continued)

*Primary Examiner* — Marcus Smith
*Assistant Examiner* — Jason A Harley
(74) *Attorney, Agent, or Firm* — Rothwell, Figg, Ernst & Manbeck, P.C.

(57) ABSTRACT

Performing random access process. In one aspect, there is a method performed by a network function. The method comprises the network function generating system information and the network function broadcasting the system information. The system information comprises i) first power information for use by at least a first set of communication devices and a second set of communication devices in determining a transmit power, and ii) second power information for use by the first set of communication devices, but not the second set of communication devices, in determining the transmit power.

8 Claims, 6 Drawing Sheets

(51) Int. Cl.

| | |
|---|---|
| *H04B 17/318* | (2015.01) |
| *H04W 28/20* | (2009.01) |
| *H04W 52/32* | (2009.01) |
| *H04W 52/36* | (2009.01) |
| *H04W 72/1273* | (2023.01) |
| *H04W 74/0833* | (2024.01) |
| *H04W 76/27* | (2018.01) |
| *H04W 88/02* | (2009.01) |

(58) Field of Classification Search
CPC ............... H04W 17/318; H04W 72/23; H04W 52/0219; H04B 7/1555; H04B 7/15528; H04B 17/318
USPC .................................................. 370/254, 311
See application file for complete search history.

(56) References Cited

U.S. PATENT DOCUMENTS

| | | | | |
|---|---|---|---|---|
| 2014/0254452 | A1* | 9/2014 | Golitschek Edler Von Elbwart | ............ H04W 52/0219 370/311 |
| 2015/0078264 | A1* | 3/2015 | Han | .................. H04W 36/0079 370/329 |
| 2018/0324716 | A1* | 11/2018 | Jeon | .................. H04W 74/0833 |
| 2019/0312619 | A1* | 10/2019 | Abedini | ............... H04B 7/0695 |
| 2021/0058971 | A1* | 2/2021 | MolavianJazi | ...... H04B 17/318 |
| 2021/0251011 | A1 | 8/2021 | You et al. | |

OTHER PUBLICATIONS

Samsung, "PRACH configuration for IAB", 3GPP TSG RAN WG1 #97, R1-1906931, Reno, USA, May 13-17, 2019 (4 pages).

3GPP TS 38.213, V15.0.1 (Mar. 2018), 3rd Generation Partnership Project; Technical Specification Group Radio Access Network; NR; Physical layer procedures for control (Release 15), Mar. 2018 (80 pages).

Nokia et al., "NR enhancements to support IAB", 3GPP TSG RAN WG1 Meeting #95, R1-1812700, Spokane, WA, USA, Nov. 12-16, 2018 (9 pages).

Nokia et al., "Enhancements on RACH for IAB", 3GPP TSG RAN WG1 Meeting #95, R1-1812705, Spokane, U.S.A., Nov. 12-16, 2018 (5 pages).

Ericsson, "Iab Rach extensions", 3GPP TSG-RAN WG1 Meeting #96bis, R1-1904833, Xi'an, China, Apr. 8-12, 2019 (4 pages).

"RAN1 Chairman's Notes", 3GPP TSG RAN WG1 Meeting #97, Reno, USA, May 13-17, 2019 (103 pages).

Peng Xu et al., "NOMA: An Information Theoretic Perspective", IEEE, arXiv:1504.07751v2 [cs.IT], May 12, 2015 (pp. 1-6).

* cited by examiner

RANDOM ACCESS CHANNEL (RACH) PROCESS FOR INTEGRATED ACCESS AND BACKHAUL (IAB) NETWORKS

CROSS REFERENCE TO RELATED APPLICATIONS

This application is a 35 U.S.C. § 371 National Stage of International Patent Application No. PCT/EP2020/080370, filed Oct. 29, 2020, which claims priority to U.S. provisional application No. 62/932,585, filed on Nov. 8, 2019. The above identified applications are incorporated by reference.

TECHNICAL FIELD

This disclosure relates to the random access process in an integrated access and backhaul (IAB) network.

BACKGROUND

Typically, when a communication device (e.g., a user equipment (UE) or a relay node) powers on, the communication device performs a random access procedure to connect to a serving base station. More specifically, a serving base station broadcasts system information that enables the communication device to transmit on a random access channel (RACH) a random access (RA) preamble. Upon receiving the RA preamble, the base station transmits an RA response. This random access procedure enables the communication device to achieve synchronization with the serving base station and obtain an uplink (UL) grant for transmitting a message to the serving base station (e.g., an RRC Connection Request).

This concept has been used in different technologies with different names. In CDMA, it is called Access Probe, in GSM it is called Channel Request, and in WCDMA/LTE/NR it is called RACH. In NR, RACH is discussed in different work items such as in integrated access and backhaul (IAB) (see e.g., reference [1]). In general, there are two, methods for RACH: contention-based and contention-free. With the contention-based approach, the communication devices randomly select and send an RA preamble, at the cost of possible contention at the receiver. With Contention-free, on the other hand, the network informs each one of the communication devices as to exactly when and which preamble signature they should use. Contention-free case is useful for the cases where the communication devices are in a connected mode.

SUMMARY

Certain challenges exist. For example, in the contention-based approach, if two communication devices send a message using the same resources (i.e., same time resource, frequency resource, and code resource, if any) the messages will be not be decodable at the receiver because the signals carrying the message will interference with each other at the receiver. This is because the communication devices adapt their transmission parameters based on almost the same target received signal quality. Thus, with two signals received in the same resources, almost the same low signal-to-interference-and-noise ratio (SINR) is observed at the receiver for both signals and, with high probability, the signals cannot be decoded correctly. The contention probability increases with the number of communication devices, because the probability of two communication devices using the same resources increases.

This disclosure describes, among other things, a method for contention-based RACH. This method can be used in, for example, IAB networks. The method exploits the characteristics of IAB networks to reduce the contention probability. In one embodiment, a predefined power offset value is used by certain types of communication devices, but not other types, when determining a transmission power for transmitting a message to the serving base station. In such an embodiment, the serving base station applies an advanced decoding scheme, such as successive interference cancellation (SIC), to decode the message and any other message that was transmitted using the same resources. In some embodiments, based on the decoding status, the serving base station adapts the RACH process for both a UE and relay node, correspondingly. In this way, the contention probability is reduced, which lead to low connection delay.

According to some embodiments, in one aspect, there is provided a method performed by a network function. The method may comprise the network function generating system information and the network function broadcasting the system information. The system information may comprise i) first power information for use by at least a first set of communication devices and a second set of communication devices in determining a transmit power, and ii) second power information for use by the first set of communication devices, but not the second set of communication devices, in determining the transmit power.

According to some embodiments, in another aspect, there is provided a method performed by a relay node. The method may comprise the relay node receiving system information broadcast by a network function and the relay node decoding the system information. The system information may comprise first power information for use in determining a transmission power. The method may further comprise the relay node determining the transmission power using the first power information and a power offset value, the relay node using a random access channel to transmit to the network function a random access preamble, the relay node receiving a random access response transmitted by the network function, and after receiving the random access response, the relay node using the determined transmission power to transmit a message to the network function.

According to some embodiments, there is provided a method performed by a network function. The method may comprise the network function receiving a random access preamble transmitted on a random access channel and after receiving the random access preamble, the network function transmitting a random access response identifying at least one uplink resource. The method may further comprise after transmitting the random access response, the network function receiving a combined signal that comprises: i) a first signal transmitted by a relay node using the uplink resource, the first signal comprising a first message generated by the relay node and ii) a second signal transmitted by a user equipment (UE) using the same uplink resource, wherein the second signal comprises a second message. The method may further comprise the network function decoding the first message, after decoding the first message, the network function removing the decoded first message from the combined signal, thereby producing a modified signal that comprises the second message, and after producing the modified signal, the network function decoding the second message from the modified signal.

In another aspect there is provided a computer program comprising instructions which when executed by processing circuitry causes the processing circuitry to perform any one of the above described methods.

In another aspect there is provided an apparatus comprising processing circuitry and a memory, wherein the memory contains instructions executable by said processing circuitry, whereby the apparatus is adapted to perform any one of the above described methods.

BRIEF DESCRIPTION OF THE DRAWINGS

The accompanying drawings, which are incorporated herein and form part of the specification, illustrate various embodiments.

DETAILED DESCRIPTION

Figure 1:
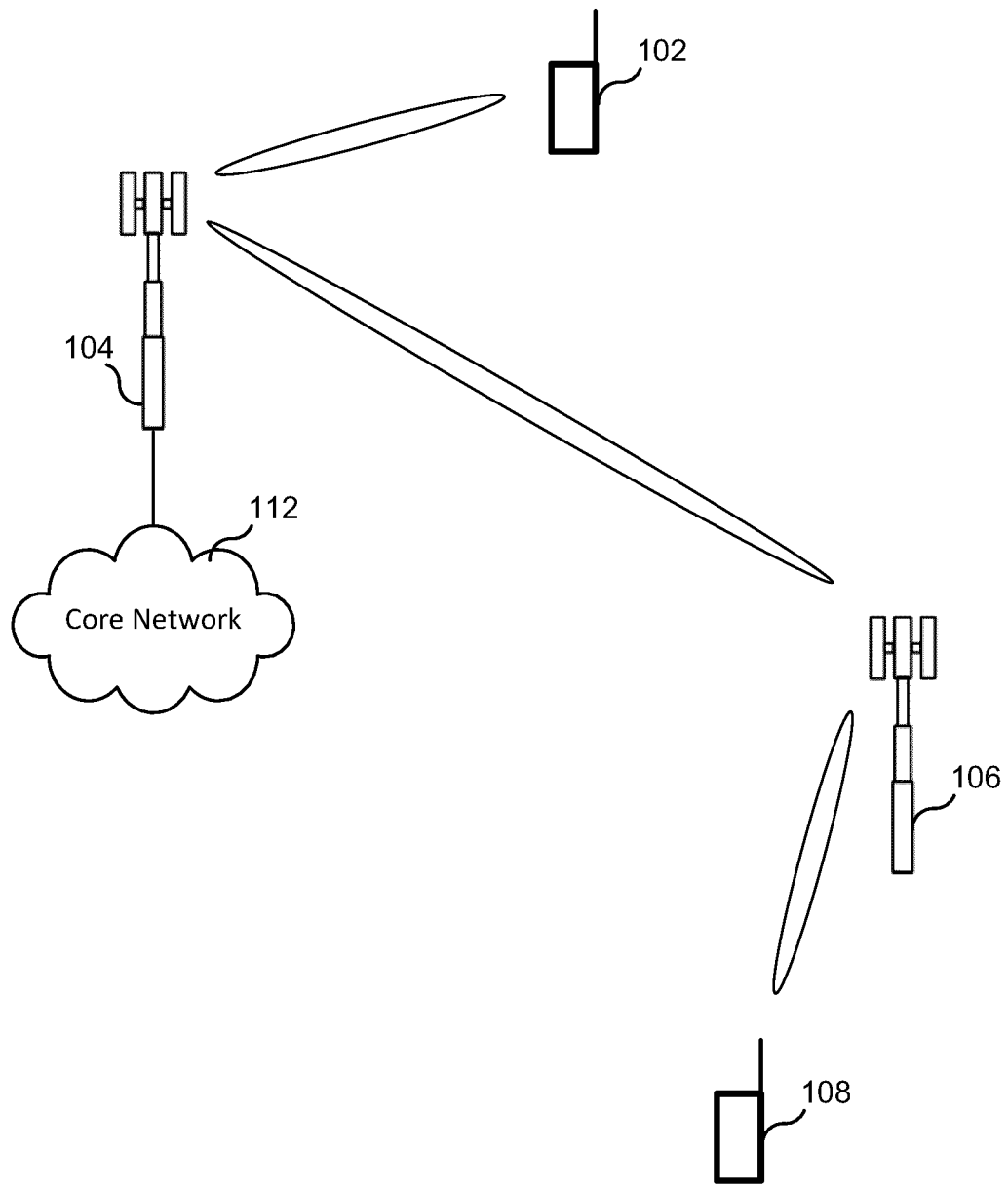
FIG. 1 illustrates an example IAB network.

FIG. 1 illustrates an example IAB network 100. In the example shown, network 100 includes a serving base station (BS) 104 (a.k.a., parent IAB node) that can serve a number of UEs (including UE 102) and a relay node 106 (a.k.a., child IAB node), which can serve a number of UEs (including UE 108). In this example, base station 104 is directly connected to a core network 112 (e.g., via an optical fiber connection), however, in other scenarios base station 104 may be connected to the core network via another base station (i.e., base station 104 may also be a child IAB node while at the same time be a parent IAB node with respect to relay node 106). The RACH scheme disclosed herein exploits the characteristics of the IAB networks to reduce the contention probability in contention-based RACH. As a result, the probability of using multiple automatic repeat request (ARQ)-based retransmissions decreases which leads to low implementation complexity/connection delay in the IAB networks.

Contention-based RACH typically follows the following procedure:

1) communication device (e.g., UE 102 and/or relay node 106) transmits to BS 104 an RA Preamble;
2) BS 104 responds to the reception of the RA preamble by transmitting an RA Response, which includes timing advance, temporary cell radio network temporary identifier (TC-RNTI), and an UL grant for a layer 2 or layer 3 (L2/L3) message;
3) after receiving the RA response, the communication device transmit to BS 104 the L2/L3 message (e.g., RRC Connection Request),
4) if BS 104 is able to decode the L2/L3 message, BS 104 will transmit a response message (e.g., RRC Connection Setup) to the communication device.

In the case where two communication devices (e.g., UE 102 and relay node 106) send an RA preamble using the same resources (e.g., time and frequency). Then, both communication devices will receive the same TC-RNTI and resource allocation at step 2). Thus, in Step 3, both communication devices send to BS 104 their respective L2/L3 messages using the same resources. In this case, these two signals act as interference to each other and, with high probability, BS 104 is unable to decode either of them. Thus, the RACH process has failed for both communication devices and they should go back to step 1).

In a typical communication scenario where BS 104 is serving multiple communication devices (e.g., UE 102 and relay node 10), the communication devices will use the same system information parameters (e.g., received target power parameter) to determine the transmission power at which the communication device will transmit the L2/L3 message. Therefore, for two communication devices transmitting in the same resources, the signals received by the BS have almost the same power which leads to low SINR for both signals received by the receiver. In such cases, contention occurs—i.e., none of the signals can be correctly decoded. This is especially because, to limit the interference, the communication devices may start with low power, close to the detection threshold, and then increase the power in a ramp-fashion.

On the other hand, in IAB network 100, it has been determined that there are advantages to be gained by configuring the relay nodes (e.g., relay node 106) such that the relay node starts the RACH process more aggressively—i.e., with higher target power, as opposed to the UEs that start with a low power and then increase the power in a ramp-fashion in possible retransmission rounds. This is because, compared to the UEs, the RACH process for relay nodes may be performed in considerably longer periods (see, e.g., reference [1]). Also, because each relay node may serve a large number of communication devices (UEs and other relay nodes), a delay in the RACH process of a relay node may affect multiple communication devices. For these reasons, it has been determined that there are advantages to setting a higher target received power for the relay node.

In this way, if BS 104 receives the signals of UE 102 and relay node 106 on the same resources, the contributions of the relay node and the UE on the accumulated received signal (i.e., the "combined" signal) will be considerably different. In such cases, BS 104 can use a SIC-based receiver to decode both messages correctly, thereby reducing contention. This is because, as shown in the literature (see, e.g., reference [2]), the probability of successful decoding for SIC-based receivers increases significantly as the difference between the power of the interfering signals increases. Accordingly, the following process is proposed:

1) receive combined signal comprising a first random access procedure message (e.g., RRC Connection Request) transmitted by UE 102 and a second random access procedure message transmitted by relay node; 2) decode the second message; 3) re-encode the second message and subtract the re-encoded message from the received combined signal, thereby producing a modified signal; 4) Check if the modified signal has the first message and decode the first message; and 5) send acknowledgement/negative acknowledgement (ACK/NACK) signals to different nodes depending on the decoding status of their signals.

In this way, although the relay node 106 and the UE 102 use the same spectrum resources, their signals can be decoded contention-free. As a result, the delay/complexity of the RACH process decreases because the ARQ-based retransmissions are omitted. Also, because the implementation of the SIC receiver may lead to a different decoding delay, compared to typical receivers, timing may be adapted correspondingly. That is, for example, UE 102 may increase a message timeout timer such that UE 102 gives BS 104 more time to transmit the RA response before declaring a failure and re-trying the RA procedure.

Furthermore, for channel estimation, the preamble's own symbols may be used. In this case, the channel estimate incorporates the colliding preamble contents and removes them as well, even if moderate channel estimate smoothing is used.

To implement the technique, BS 104 can still broadcasts a single received target power. However, certain types of communication devices (e.g., relay nodes) should apply a power offset that is added to the target received power. As an example for the offset value of the target power, we can consider down to 3 dB, as different research works have shown that to be enough guaranteeing appropriate performance for SIC. Indeed, the success probability of the SIC receiver increases by increasing the power imbalance, at the cost of additional interference to neighbor nodes.

The following two points are worth noting. First, while the proposed scheme may increase the UL interference level, the additional interference will be negligible for the following reasons. Compared to UEs, the child IAB nodes (a.k.a., relay nodes) have more antennas/much better spatial selectivity towards their parent IAB node and are expected to be installed at higher heights. Also, compared to typical UEs, the RACH process of the child IAB nodes are expected to be done less frequently (e.g., in 3GPP RAN #1, a scaling factor has been introduced which enables longer periods for IAB RACH up to 640 ms—see reference [1]). For these reasons, the additional interference will be negligible. Additionally, although the proposed scheme may increase the UL interference in the first transmissions, it reduces the probability of retransmissions, which are based on ramp-based power increase.

Second, the proposed scheme significantly reduces the probability of contention from the simultaneous transmission from an UE and a child IAB node, but may not significantly reduce the probability of contention from the simultaneous transmission from two different child IAB nodes. But, in any event, there is a low probability that two child IAB nodes will perform the RACH process simultaneously because, while BS 104 may be responsible for many UEs, it may serve only a few relay nodes. Therefore, compared to the cases with RACH contention of an UE and an IAB node, there is a very low probability of contention from the simultaneous transmission of two child IAB nodes. In case of collision from the transmission of two child IAB nodes, we can still use the typical schemes to utilize the low cross-correlation properties of the preambles and resolve the collision given that the SINR is high enough.

Figure 2:
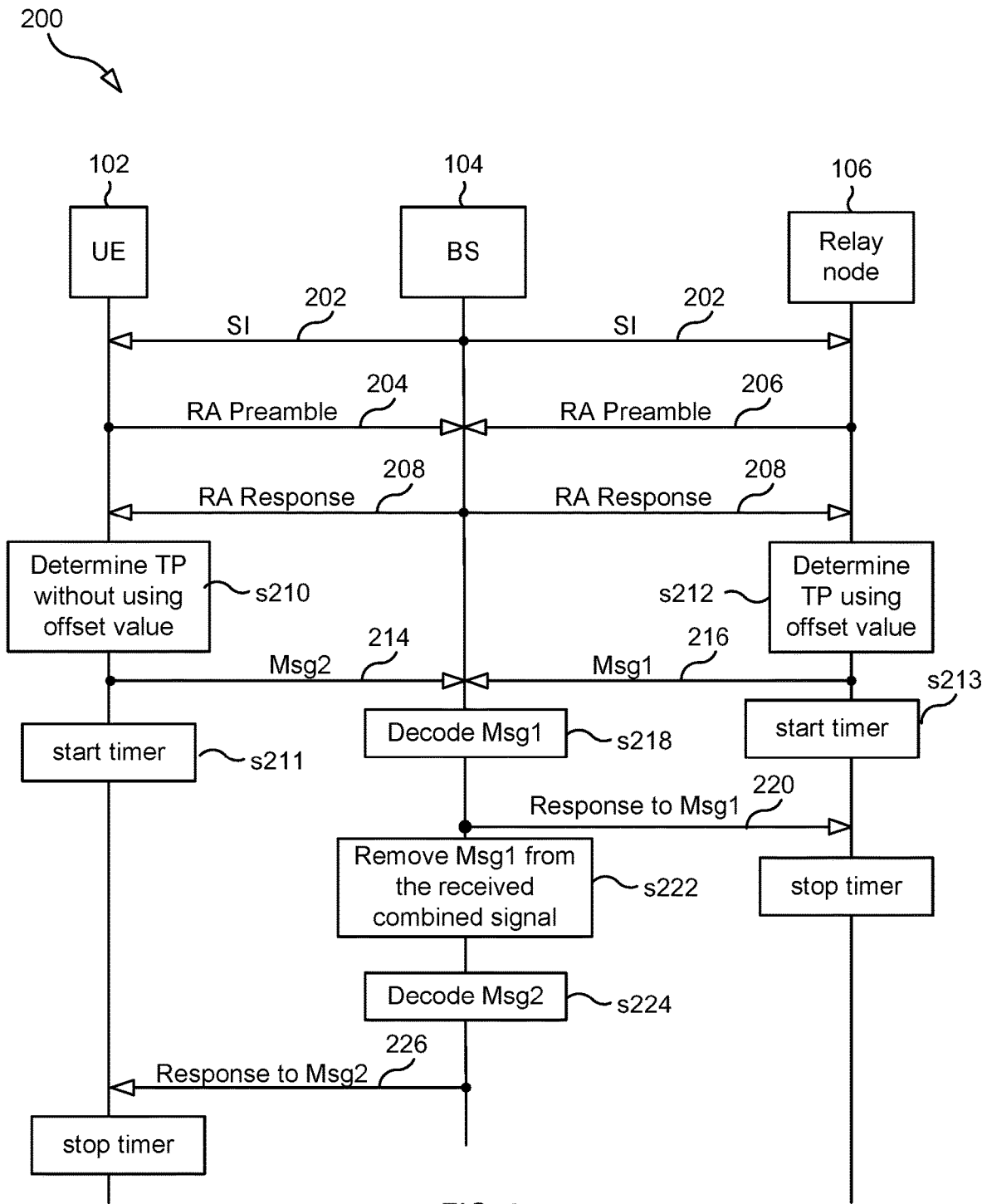
FIG. 2 is a message flow diagram illustrating a process according to an embodiment.

FIG. 2 is a message flow diagram illustrating a process 200 according to an embodiment. As shown in FIG. 2, BS 104 broadcasts system information 202 (e.g., System Information Block 2 (SIB2)). The system information includes first power information for use by all types of communication devices in determining a transmission power at which to transmit the L2/L3 message disclosed herein. For example, the first power information may include, among other parameters: i) an initial received target power value (in one embodiment this initial received target power value is specified by the SIB2 parameter "preambleInitialReceivedTargetPower") and ii) a reference signal power value specifying a transmit power of a reference signal transmitted by BS 104. In some embodiments, the system information also includes second power information for use by only a certain type (or types) of communication devices (e.g., relay nodes).

As further shown in FIG. 2, both UE 102 and relay node 106 receive the system information 202. Next, UE 102 transmits an RA preamble 204, and, at the same time, relay node 106 also transmits an RA preamble 206. Next, BS 104 transmits an RA response 208 responding to at least one of preamble 204 or preamble 206. Next, both UE 102 and relay node 106 receive the response 208. In some embodiments, response 208 includes information identifying at least one uplink resource. Response 208 may also include timing information and temporary identifier (e.g., TC-RNTI). Next, UE 102 will determine a transmission power (step s210) and relay node 106 will determine a transmission power (s212). In determining the respective transmission powers, UE 102 will not employ the power offset value, but relay node 106 will, such that relay node will transmit the L2/L3 message with higher power than UE 102. As indicated above, the power offset value may be included in the system information 202. But in another embodiment, the power offset value may be pre-configured in relay node 106 and not included in SI 202.

Next, UE 102 transmits its L2/L3 message (Msg2) 214 using the transmission power that it determined in step s210. Similarly, relay node 106 transmits its L2/L3 message (Msg1) 216 using the transmission power that it determined in step s212.

Next, BS 104 receives a combined signal comprising Msg1 and Msg2 and then, in one embodiments, BS 104 uses a SIC-based receiver to first decode Msg1 (step s218) and then decode message 2 (step s224). In the example shown, BS 104 decodes Msg2 by first removing Msg1 from the combined signal (step s222) (e.g., after decoding Msg1, BS 104 re-encodes Msg1 and then substracts it from the combined signal, thereby producing a modified signal that contains Msg2, but not Msg1) and then decoding Msg2 from the modified signal.

After decoding Msg1, BS 104 transmits a response 220 to relay node 106. And after decoding Msg2, BS 104 transmits a response 226 to UE 102. In some embodiments, Msg1 includes a first identifier for identifying relay node 106, Msg2 includes a second identifier identifying UE 102, response 220 includes the first identifier, and response 226 includes the second identifier.

Also, as shown in FIG. 2, UE 102 may start a timer (step s211) after transmitting Msg2. UE 102 may be configured to re-start the random access procedure if UE 102 does not receive the response 226 before the timer expires. Accordingly, because BS 104 may be delayed in sending response 226 due to the fact that BS 104 first decodes Msg1 and removes Msg1 from the combined signal before decoding Msg2, UE 102 may be configured to set the timer to expire after t+delta seconds (delta being greater than zero), whereas normally UE 102 would be configured to set the timer to expire after t seconds. For instance, if the system information (SI) broadcast by BS 104 includes information indicating that BS 104 may be delayed in sending the response 226 (e.g., if the SI contains a non-zero power offset value then this provides an indication to the UE 102 that BS 104 will employ a SIC-based receiver and thus be delayed in sending the response), then UE 102 would sent timer to expire after t+delta second, otherwise UE sets the time to expire after t seconds. In an alternative embodiment, the SI may explicitly instruct the UE 102 to set the time to expire after t or t+delta seconds. Similarly, after transmitting Msg1, relay node may start a timer (step s213) that is set to expire after t seconds. The relay node's timer may be set to expire sooner than the UE's timer because the BS 104 is not delayed in sending response 220.

Figure 3:
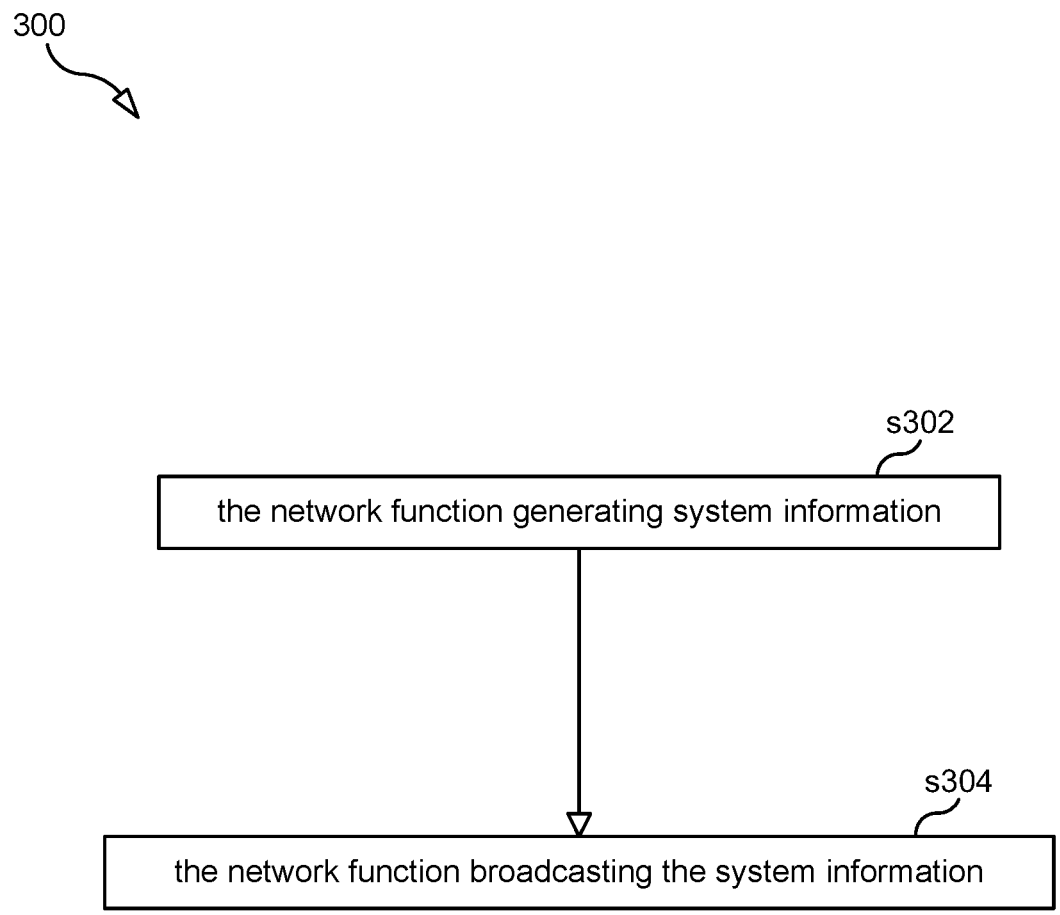
FIG. 3 is a flowchart illustrating a process according to an embodiment.

FIG. 3 is a flowchart illustrating a process 300 according to an embodiment. Process 300 may begin in step s302.

Step s302 comprises a network function generating system information 202. The network function is BS 104 or a component of BS 104.

Step s304 comprises the network function broadcasting the system information 202.

The system information 202 may comprise first power information for use by at least a first set of communication devices and a second set of communication devices in determining a transmit power, and second power information for use by the first set of communication devices, but not the second set of communication devices, in determining the transmit power.

In some embodiments, the first set of communication devices comprises any communication device that is not power constrained and/or any communication device that performs the RA procedure infrequently (i.e., the frequency with which the device performs the RA procedure is less than a threshold). In some embodiments, the first set of communication device comprises any relay node of a certain type (e.g., a child integrated access and backhaul, IAB, communication devices). In some embodiments, the second set of communication device comprises any terminal communication device (a.k.a., user equipment (UE)).

In some embodiments, the first power information comprises: i) an initial received target power value and ii) a reference signal power value specifying a transmit power of a reference signal.

In some embodiments, the second power information comprises a power offset value.

Figure 4:
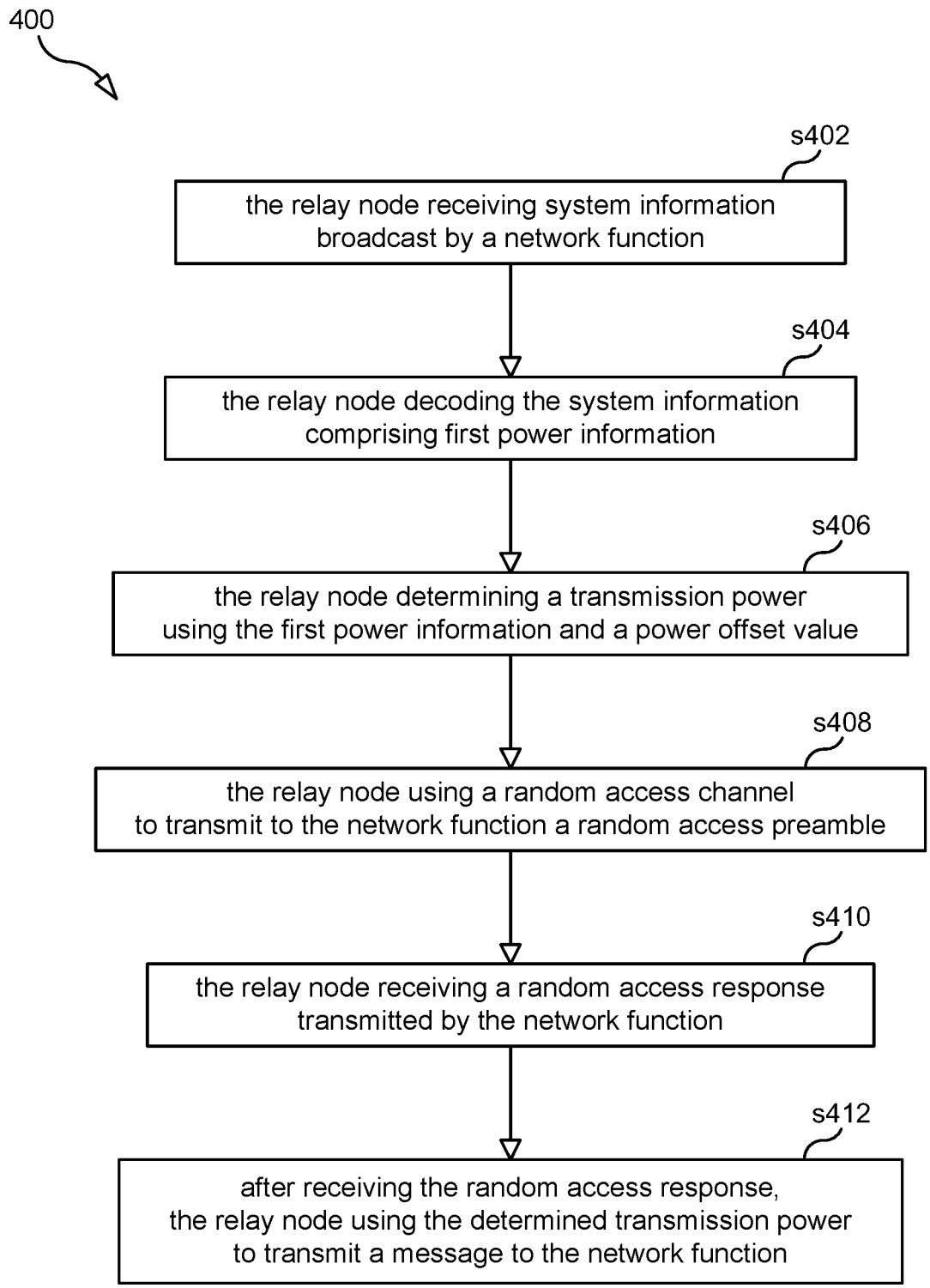
FIG. 4 is a flowchart illustrating a process according to an embodiment.

FIG. 4 is a flowchart illustrating a process 400 according to an embodiment. Process 400 may begin in step s402.

Step s402 comprises relay node 106 receiving system information 202 broadcast by the network function.

Step s404 comprises the relay node decoding the system information. The system information may comprise first power information for use in determining a transmission power.

Step s406 comprises the relay node determining the transmission power using the first power information and a power offset value. In some embodiments, the system information 202 includes the power offset value.

Step s408 comprises the relay node using a random access channel to transmit to the network function random access preamble 206.

Step s410 comprises the relay node receiving random access response 208 transmitted by the network function.

Step s412 comprises after receiving the random access response, the relay node using the determined transmission power to transmit message 216 to the network function.

In some embodiments, the first power information comprises: i) an initial received target power value and ii) a reference signal power value specifying a transmit power of a reference signal.

In some embodiments, the first power information further comprises the power offset value.

In some embodiments, determining the transmission power comprises the relay node calculating the transmission power using: the initial received target power value, the reference signal power value, and the power offset value.

In some embodiments, calculating the transmission power comprises: the relay node determining a path loss value based on a measured reference signal received power (RRSP) value and the reference signal power value and the relay node calculating the transmission power using: the initial received target power value, the path loss value, and the power offset value.

In some embodiments, the random access response comprises timing information, the message is a Radio Resource Control (RRC) Connection Request, and the time at which the message 216 is transmitted is based on the timing information.

Figure 5:
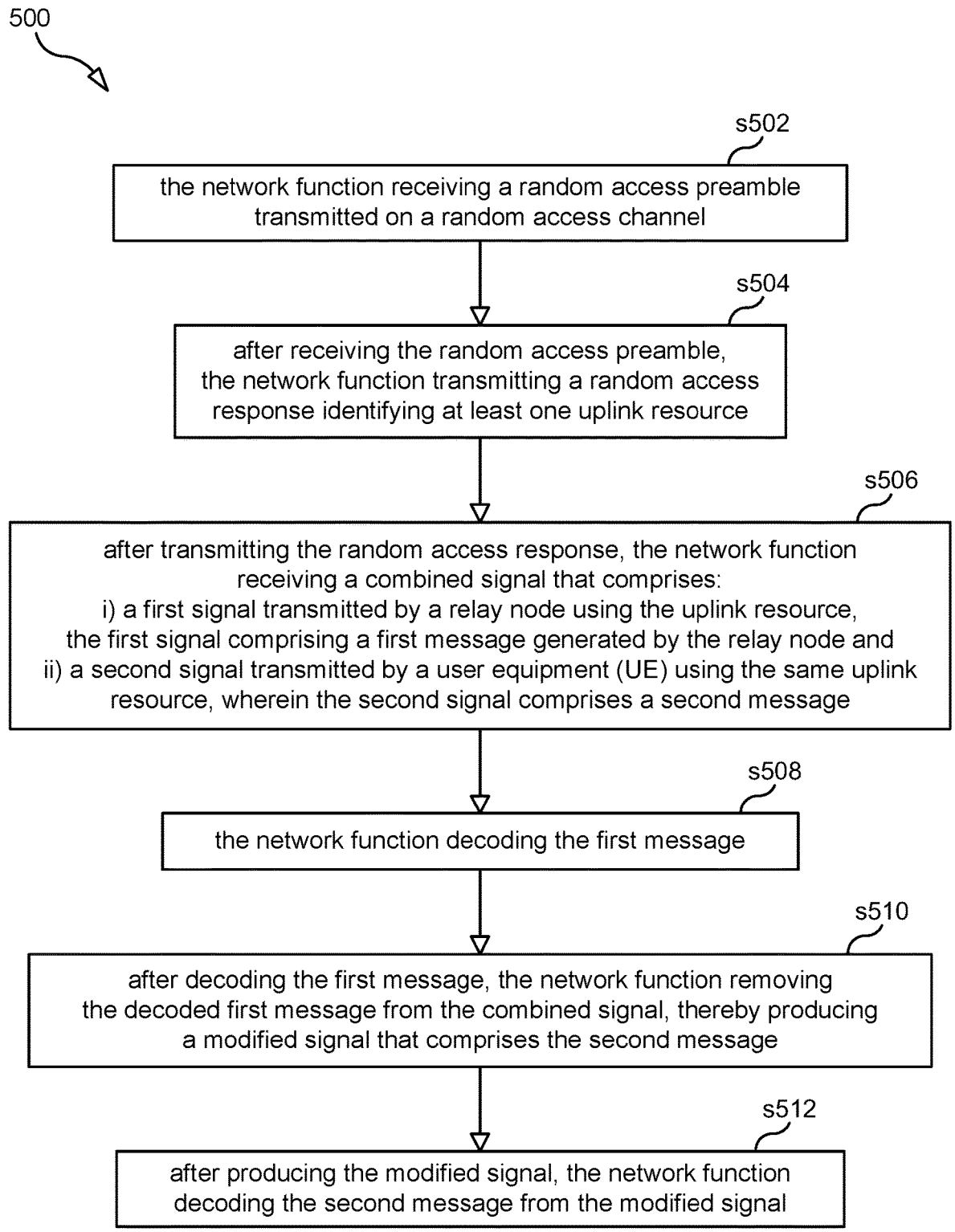
FIG. 5 is a flowchart illustrating a process according to an embodiment.

FIG. 5 is a flowchart illustrating a process 500 according to an embodiment. Process 500 may begin in step s502.

Step s502 comprises the network function receiving a random access preamble 204/206 transmitted on a random access channel.

Step s504 comprises after receiving the random access preamble, the network function transmitting random access response 208 that identifies at least one uplink resource.

Step s506 comprises after transmitting the random access response, the network function receiving a combined signal that comprises: i) a first signal transmitted by relay node 106 using the uplink resource, the first signal comprising message 216 generated by the relay node and ii) a second signal transmitted by UE 102 using the same uplink resource, wherein the second signal comprises message 214.

Step s508 comprises the network function decoding message 216.

Step s510 comprises after decoding message 216, the network function removing the decoded message 216 from the combined signal, thereby producing a modified signal that comprises message 214.

Step s512 comprises after producing the modified signal, the network function decoding message 214 from the modified signal.

In some embodiments, message 216 comprises a first identifier for identifying the relay node, and message 214 comprises a second identifier for identifying the UE.

In some embodiments, after decoding message 216, the network function transmitting to the relay node a first response message 220 that comprises the first identifier that identifies the relay node and after decoding message 214, the network function transmitting to the UE a second response message 226 that comprises the second identifier that identifies the UE.

In some embodiments, message 216 is a Radio Resource Control (RRC) Connection Request, and message 214 is an RRC Connection Request.

Figure 6:
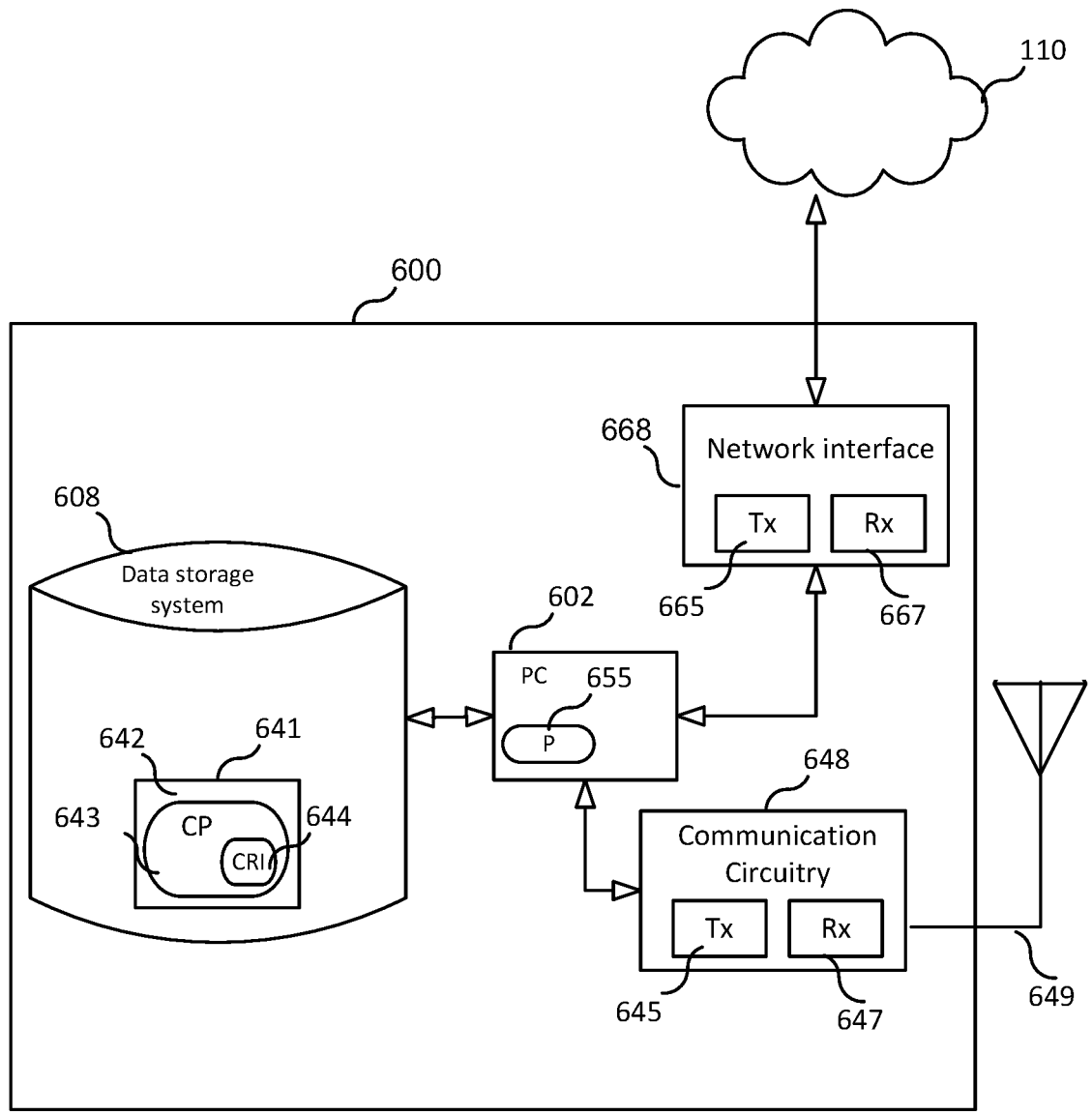
FIG. 6 is a block diagram of an apparatus according to an embodiment.

FIG. 6 is a block diagram of an apparatus 600, according to some embodiments, for implementing BS 104 or relay node 106. As shown in FIG. 6, apparatus 600 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); a network interface 668 comprising a transmitter (Tx) 665 and a receiver (Rx) 667 for enabling apparatus 600 to transmit data to and receive data from other nodes connected to a network 110 (e.g., an Internet Protocol (IP) network) to which network interface 648 is connected; communication circuitry 648, which is coupled to an antenna arrangement 649 comprising one or more antennas and which comprises a transmitter (Tx) 645 and a receiver (Rx) 647 for enabling apparatus 600 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

The following is a summary of various embodiments described herein:

A1. A method performed by a network function, the method comprising: the network function generating system information; and the network function broadcasting the system information, wherein the system information comprises: i) first power information for use by at least a first set of communication devices and a second set of communication devices in determining a transmit power, and ii) second power information for use by the first set of communication devices, but not the second set of communication devices, in determining the transmit power.

A2. The method of embodiment A1, wherein the first set of communication devices comprises any communication device that is not power constrained and/or any communication device that performs a random access procedure infrequently.

A3. The method of embodiment A1, wherein the first set of communication device comprises any relay node of a certain type (e.g., a child integrated access backhaul, IAB, communication devices).

A4. The method of any one of embodiments A1-A3, wherein the second set of communication device comprises any terminal communication device (a.k.a., user equipment (UP).

A5. The method of any one of embodiments A1-A4, wherein the first power information comprises: i) an initial received target power value and ii) a reference signal power value specifying a transmit power of a reference signal.

A6. The method of embodiment A5, wherein the second power information comprises a power offset value.

B1. A method performed by a relay node, the method comprising: the relay node receiving system information broadcast by a network function; the relay node decoding the system information, wherein the system information comprises first power information for use in determining a transmission power; the relay node determining the transmission power using the first power information and a power offset value; the relay node using a random access channel to transmit to the network function a random access preamble; the relay node receiving a random access response transmitted by the network function; and after receiving the random access response, the relay node using the determined transmission power to transmit a message to the network function.

B2. The method of embodiment B 1, wherein the first power information comprises: i) an initial received target power value and ii) a reference signal power value specifying a transmit power of a reference signal.

B3. The method of embodiment B1 or B2, wherein the first power information further comprises the power offset value.

B4. The method of embodiment B1, B2, or B3, wherein determining the transmission power comprises the relay node calculating the transmission power using: the initial received target power value, the reference signal power value, and the power offset value.

B5. The method of embodiment B4, wherein calculating the transmission power comprises: the relay node determining a path loss value based on a measured reference signal received power (RRSP) value and the reference signal power value; and the relay node calculating the transmission power using: the initial received target power value, the path loss value, and the power offset value.

B6. The method of any one of embodiment B1-B5, wherein the random access response comprises timing information, the message is a Radio Resource Control (RRC) Connection Request, and the time at which the message is transmitted is based on the timing information.

C1. A method performed by a network function, the method comprising: the network function receiving a random access preamble transmitted on a random access channel; after receiving the random access preamble, the network function transmitting a random access response identifying at least one uplink resource; after transmitting the random access response, the network function receiving a combined signal that comprises: i) a first signal transmitted by a relay node using the uplink resource, the first signal comprising a first message generated by the relay node and ii) a second signal transmitted by a user equipment, UE, using the same uplink resource, wherein the second signal comprises a second message; the network function decoding the first message; after decoding the first message, the network function removing the decoded first message from the combined signal, thereby producing a modified signal that comprises the second message; and after producing the modified signal, the network function decoding the second message from the modified signal.

C2. The method of embodiment C1, wherein the first message comprises a first identifier for identifying the relay node, and the second message comprises a second identifier for identifying the UE.

C3. The method of embodiment C2, further comprising: after decoding the first message, the network function transmitting to the relay node a first response message that comprises the first identifier that identifies the relay node; and after decoding the second message, the network function transmitting to the UE a second response message that comprises the second identifier that identifies the UE.

C4. The method of embodiment C3, wherein the first message is a Radio Resource Control (RRC) Connection Request, and the second message is an RRC Connection Request.

D1. A computer program 643 comprising instructions 644 which when executed by processing circuitry 602 causes the processing circuitry 602 to perform the method of any one of the above embodiments.

D2. A carrier containing the computer program of embodiment D1, wherein the carrier is one of an electronic signal, an optical signal, a radio signal, and a computer readable storage medium 642).

E1. An apparatus 600), the apparatus being adapted to perform the method of any one of the embodiments disclosed above.

F1. An apparatus 600), the apparatus comprising: processing circuitry 602); and a memory 642), said memory containing instructions 644 executable by said processing circuitry, whereby said apparatus is adapted to perform the method of any one of the embodiments disclosed above.

While various embodiments are described herein (including the Appendices, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] R1-1904833, Ericsson, "TAB RACH extensions," April 2019, available at: www.3gpp.org/DynaReport/TDocExMtg--R1-96b--32822.htm

[2] P. Xu, Z. Ding, X. Dai, H. Vincent Poor, "NOMA: An Information Theoretic Perspective," arXiv: 1504.07751.

The invention claimed is:

1. A method performed by a network function, the method comprising:
the network function receiving a random access preamble transmitted on a random access channel;
after receiving the random access preamble, the network function transmitting a random access response identifying at least one uplink resource;
after transmitting the random access response, the network function receiving a combined signal that comprises:
  i) a first signal transmitted by a relay node using the uplink resource, the first signal comprising a first message generated by the relay node, and
  ii) a second signal transmitted by a user equipment, UE, using the same uplink resource, wherein the second signal comprises a second message;
the network function decoding the first message;
after decoding the first message, the network function producing a modified signal that comprises the second message by removing the decoded first message from the combined signal; and
after producing the modified signal, the network function decoding the second message from the modified signal.

2. The method of claim 1, wherein
the first message comprises a first identifier for identifying the relay node, and
the second message comprises a second identifier for identifying the UE.

3. The method of claim 2, further comprising:
after decoding the first message, the network function transmitting to the relay node a first response message that comprises the first identifier that identifies the relay node; and
after decoding the second message, the network function transmitting to the UE a second response message that comprises the second identifier that identifies the UE.

4. The method of claim 3, wherein
the first message is a Radio Resource Control (RRC) Connection Request, and
the second message is an RRC Connection Request.

5. An apparatus, the apparatus comprising:
memory; and
processing circuitry coupled to the memory, wherein the apparatus is configured to perform a method comprising:
receiving a random access preamble transmitted on a random access channel;
after receiving the random access preamble, transmitting a random access response identifying at least one uplink resource;
after transmitting the random access response, receiving a combined signal that comprises:
  i) a first signal transmitted by a relay node using the uplink resource, the first signal comprising a first message generated by the relay node, and
  ii) a second signal transmitted by a user equipment, UE, using the same uplink resource, wherein the second signal comprises a second message;
decoding the first message;
after decoding the first message, producing a modified signal that comprises the second message by removing the decoded first message from the combined signal; and
after producing the modified signal, decoding the second message from the modified signal.

6. The apparatus of claim 5, wherein
the first message comprises a first identifier for identifying the relay node, and
the second message comprises a second identifier for identifying the UE.

7. The apparatus of claim 4, wherein the method further comprises:
after decoding the first message, transmitting to the relay node a first response message that comprises the first identifier that identifies the relay node; and
after decoding the second message, transmitting to the UE a second response message that comprises the second identifier that identifies the UE.

8. The apparatus of claim 7, wherein
the first message is a Radio Resource Control (RRC) Connection Request, and
the second message is an RRC Connection Request.

* * * * *